June 14, 1932. S. SHAFER, JR 1,862,946

TIMING AND RECORDING MECHANISM

Filed Feb. 27, 1928 5 Sheets-Sheet 1

Inventor
SAMUEL SHAFER, JR.,
By Barker and Collings
Attorney.

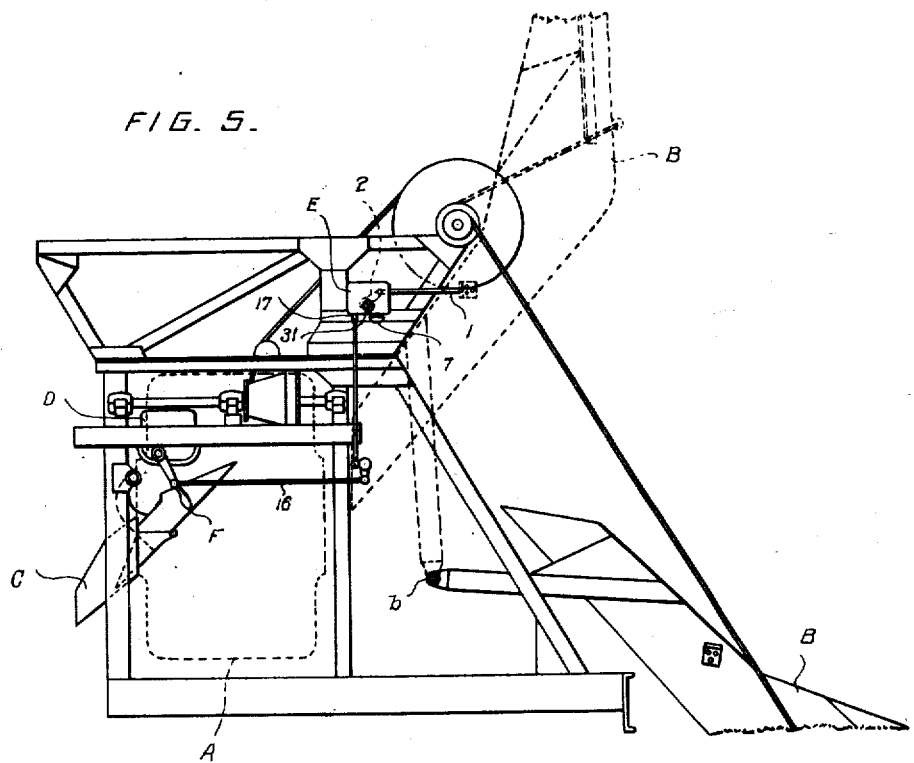

June 14, 1932.   S. SHAFER, JR   1,862,946
TIMING AND RECORDING MECHANISM
Filed Feb. 27, 1928   6 Sheets-Sheet 4
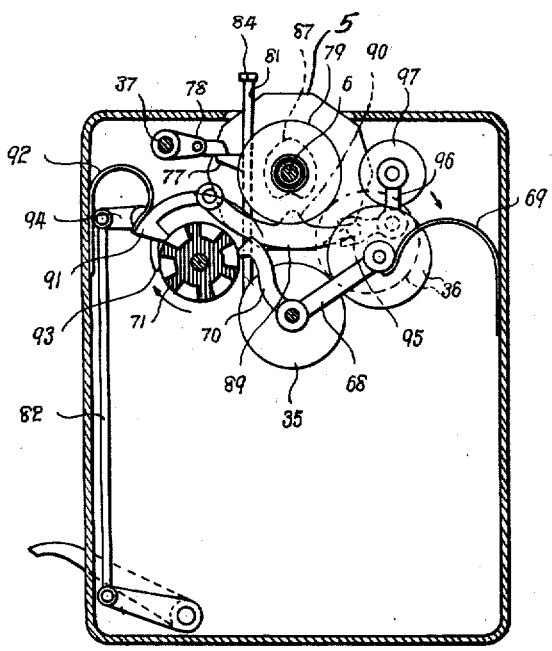
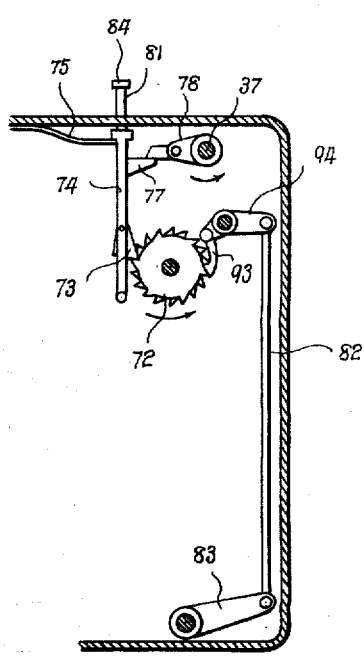
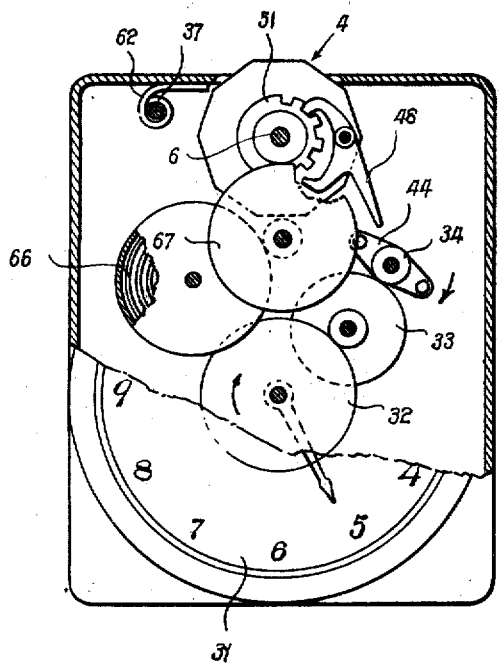
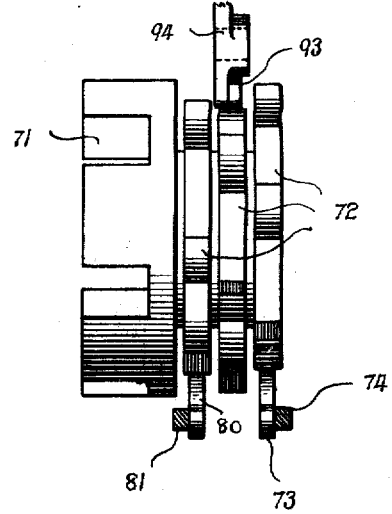
Inventor:
SAMUEL SHAFER, JR.
By Barker & Collings
Attorneys June 14, 1932.   S. SHAFER, JR   1,862,946
TIMING AND RECORDING MECHANISM
Filed Feb. 27, 1928    6 Sheets-Sheet 5

Inventor:
SAMUEL SHAFER, JR,
By Bankin & Collins
Attorneys

June 14, 1932.  S. SHAFER, JR  1,862,946
TIMING AND RECORDING MECHANISM
Filed Feb. 27, 1928   6 Sheets-Sheet 6
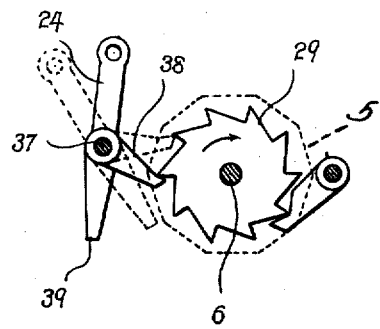
FIG. 8.
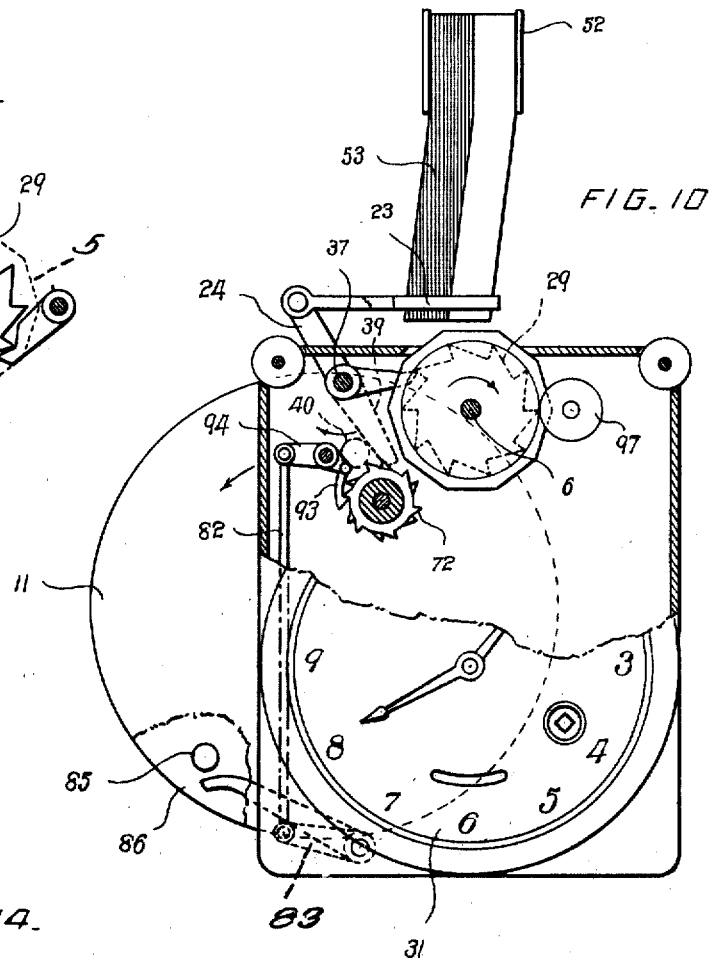
FIG. 10.
FIG. 14.
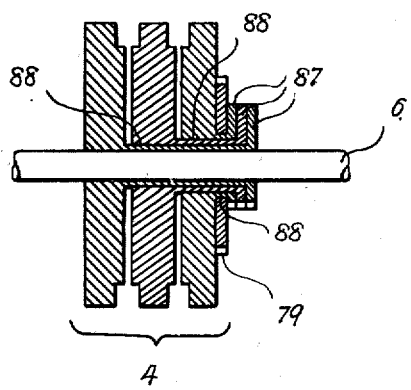
Inventor:
SAMUEL SHAFER, JR,
By Baxter & Colling
Attorneys Patented June 14, 1932

1,862,946

UNITED STATES PATENT OFFICE

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN

TIMING AND RECORDING MECHANISM

Application filed February 27, 1928. Serial No. 257,260.

This invention relates to automatic timing and recording mechanism that has been devised with especial reference to being used in connection with concrete mixing machinery, and which, when thus applied, is adapted to record the number of successive batches of concrete that are mixed and delivered, the time at which each batch is delivered, and the length of time the materials entering into the successive batches of concrete are in the rotating drum or receptacle and subjected to the mixing operations.

While the invention, as illustrated, is intended to record the data above specified, it is apparent that it may be adapted to other uses, and therefore I wish it to be understood that it is not limited beyond what is expressed in the claims hereof.

It is well understood that the strength and durability of concrete depends upon the complete hydration of the cement, and upon the proper and sufficient mixing of the cement, water and other ingredients that may enter into the composition of the concrete; and it has come to be the practice, in preparing specifications for concrete and cement work, to write into them definitely the minimum length of time that each batch of concrete must be subject to the mixing operation before it is delivered for incorporation into the structure being built; and, since insufficient mixing impairs the strength and durability of the completed structure, it is customary also to write into the specification a penalty to which the contractor shall be subjected for insufficient mixing. On the other hand it is of importance to the contractor that his mixing apparatus shall be operated at maximum capacity; that is, there shall be as little delay as is practicable between successful mixing operations, for the aggregate of such delays in any one day is the equivalent of the machine being idle for that length of time.

Many inventions have been made and applied to concrete mixing apparatus for measuring and indicating the minimum length of time for mixing a batch of concrete and also for rendering it impossible to deliver the material from the mixing drum or receptacle until that minimum time has expired. Devices for this purpose have come to be known as batch meters.

While my invention is not intended to supersede the use of batch meters, it does enable such devices to be simplified in construction, especially by the elimination of certain parts that have heretofore been considered to be essential; and in addition to this it provides a record showing the exact performances of the apparatus to which it is applied, thus providing a check upon the individual workman who may control the machine, and so safeguarding the interests of the contractor, and also, since it records whenever an operation has been improperly performed, safeguarding the interests of the one for whom the work is being done.

In the accompanying drawings in which is illustrated one practical embodiment of my invention:

Fig. 3 is a development in plan of the recording wheels.

Fig. 4 is a plan view of a short section of a record made by the apparatus.

Fig. 5 is a side view on a small scale of a concrete mixing apparatus to which my invention is applied.

Fig. 6 is an elevation, partly in section on the line VI—VI of Fig. 7, illustrating the connections between the clock mechanism and the time-recording wheels.

Fig. 8 is a sectional view on the line VIII—VIII of Fig. 7.

Fig. 10 is an elevation partly in section on the line X—X of Fig. 7.

Fig. 11 is a detailed sectional view on the line XI—XI of Fig. 7 illustrating the mechanism that controls the movements of the recording wheels employed to show the time consumed in each operation of the machine to which this time-recording apparatus is applied.

Fig. 12 is a sectional view on the line XII—XII of Fig. 7 looking in the direction opposite that to which Fig. 11 is viewed.

Fig. 13 is a detail view enlarged of the wheels designated 71 and 72.

Fig. 14 is a central longitudinal sectional view, enlarged, through the set of printing wheels, designated 4, employed for recording the timing of the individual operations of the machine.

Figure 1:
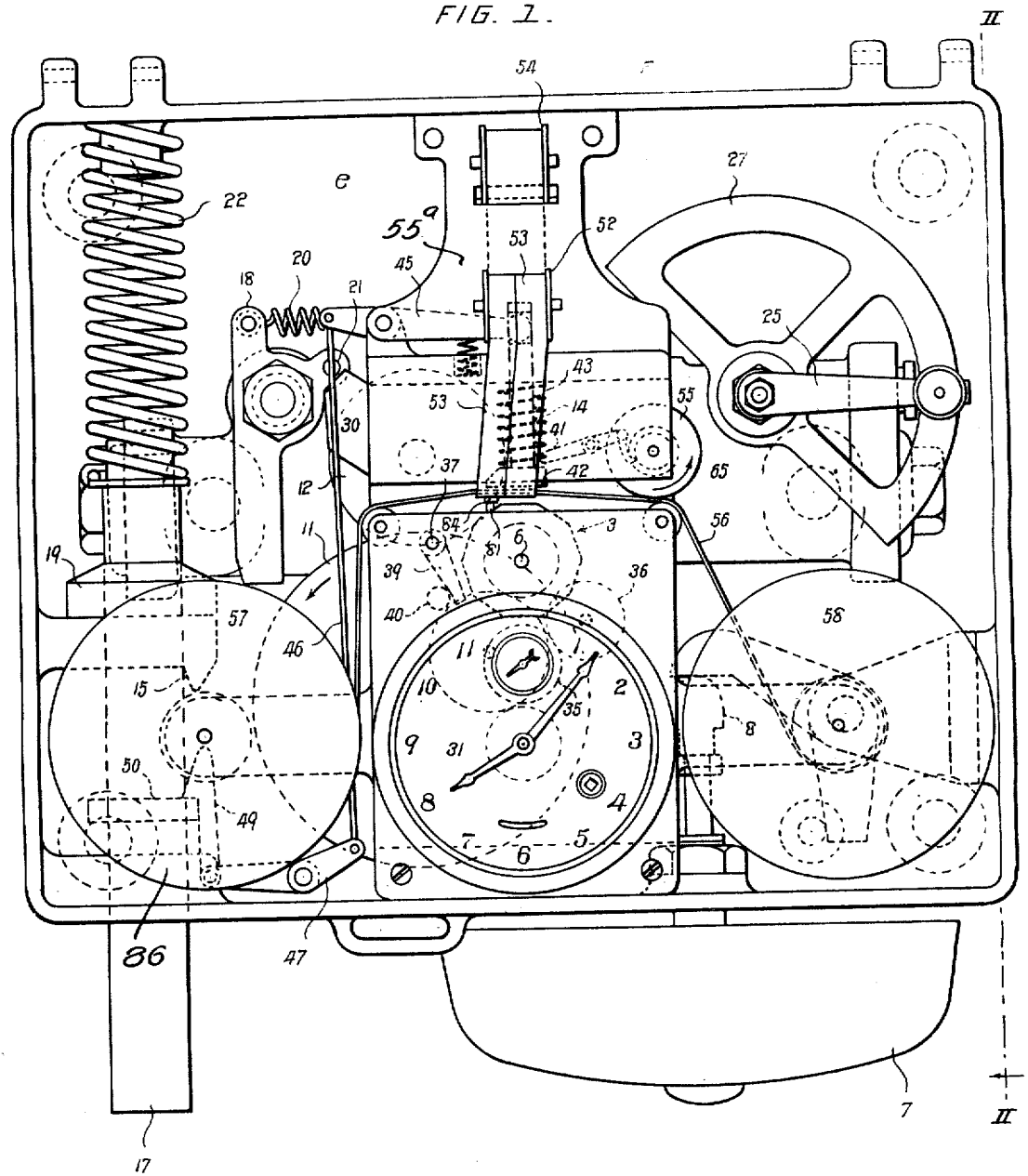
Fig. 1 is a face view of a batch meter for a concrete mixing apparatus combined with recording mechanism, embodying my invention, the front wall of the casing being removed.

First referring particularly to Fig. 5 of the drawings, A indicates the rotating concrete mixing drum of a road-paving machine; B, the charging skip therefor pivotally supported at $b$, and C the discharge chute. The latter is of the power-operated type, the mechanism for controlling and moving it being mounted within a casing D. This discharge-chute-operating mechanism may be like that illustrated in my Patent 1,415,411 of May 9, 1922; but it is not herein illustrated, it being sufficient in this case to show only the exposed handle F by which the movements of the discharge chute are manually controlled.

E designates the casing in which the timing mechanism or batch meter is arranged. This mechanism is arranged to be set into operation whenever the charge of material to be mixed is delivered into the drum A. Thus when the loading skip B comes to delivery position, as shown in dotted lines, it may impinge against the end of a push rod 1, which is connected with the set lever or arm 2 of the timing mechanism or batch meter.

The handle F of the mechanism for operating the discharge chute C is shown as connected, through linkage 16, with a rod 17, constituting part of the batch meter.

Briefly stated the operation is as follows: When the skip charges the mixing drum the batch meter is set, and begins to function at practically the instant that the full charge enters the drum and the mixing operation begins. The batch meter automatically runs for a determined length of time and when that period has elapsed a signal such as bell 7 is operated through striking mechanism 8, Figure 1. If the batch meter be of the type that locks the discharge chute in its non-delivery position during the operation of the timing mechanism, as is contemplated by the present illustration of my invention, the setting of the timing mechanism by the engagement of the skip with the rod 1 locks the member 17 against movement, and as this member is connected through the linkage 16 with the handle F, the latter cannot be shifted to cause the discharge chute to be moved to position to deliver concrete from the drum until the rod 17 is unlocked or released, this taking place when the period of time measured by the timing apparatus has elapsed.

My invention, however, enables the locking of the discharge chute to be dispensed with by the omission of the locking features, which latter will later herein be briefly described.

The batchmeter, shown in the drawings hereof, is not illustrated in detail as its particular construction does not constitute part of the present invention, but is made the subject-matter of an application for Patent Number 105,798, filed by me on the 30th day of April 1926, which has since matured into Patent No. 1,800,666 granted April 14, 1931.

For an understanding of the present invention it is sufficient to state that when the mixing drum is charged the arm 2 is moved and turns wheels 12 and 11 (these turning but partial revolutions in the arrangement illustrated), sets the batchmeter, and puts a coiled spring 76 under tension; then when the batch meter is released, upon the return of the loading skip, the spring 76, reacting through the gearing 11, 12, causes the reciprocation of a part of the batch meter moving within the guide or cylinder 65, the speed of which movement is controlled by mechanism, such as suggested by the adjustable arm 25 movable over a segment 27. It will be understood that the length of time that it takes for the reciprocating part within the guide cylinder 65 to make its traverse as determined by the position of the adjustable arm 25, determines the period which the timing device measures. When it completes its traverse the bell 7 is sounded and the operator knows that the batch of material within the drum A has been sufficiently mixed and is in condition to be discharged, and he may then operate the handle F to shift the chute C to delivery position.

If the operations just briefly described are performed with the minimum of time elapsing between each successive operation, the machine will be operating at its maximum efficiency and in the manner in which it is intended to operate. If the time elapsing between the discharge of successive batches from the drum be unduly long, the product of the machine is correspondingly reduced and its efficiency impaired to that extent. If the mixed material be discharged from the drum before the signal 7 is operated the product of the machine is impaired due to insufficient mixing and the contractor may be subject to penalty.

The batch meter is shown as located in a rear compartment $e$ of the casing E and the recording mechanism which is combined therewith in a front compartment $e'$. The recording mechanism is supported upon a plate 55ᵃ that is removably supported within the casing E and constitutes a partition more or less completely separating the compartments e and e′, as determined by the shape of the plate, and as may be found desirable.

The front wall of the casing consists of a hinged door G giving access to the recording mechanism and the batch meter. This door may be locked, so that access to the apparatus, which when properly set up is entirely automatic, may be had only by a duly authorized person.

The recording apparatus comprises a clock mechanism 31 that may be provided with a dial and hands to show the time of day, the door G being provided with a transparent section through which the face of the clock may be observed.

Adjacent to the clock, and preferably just above the same, are three sets of printing wheels 3, 4 and 5, the wheels of each set being individually mounted side by side upon a common shaft 6, suitably supported. These wheels are adapted to print upon a tape 56. There are three printing wheels in the group 3; the first bearing numbers from one to 12 inclusive, the second from 0 to 6, and the third from 0 to 9, and these are used to print the time of day upon the portion i of the tape 56. The second group, 4, of printing wheels comprises three wheels, each numbered from 0 to 9 inclusive, and they print upon the section j of the tape 56, to indicate in seconds of time, the actual duration of the mixing, or other operation, of which a record is being made. The wheels of the third group, 5, are each numbered from 0 to 9 and constitute an ordinary consecutive numbering attachment adapted to print upon the portion k of the strip or tape 56.

The time recording wheels 3 are connected through suitable gearing with the clock mechanism, this connection being such that the numbers on the peripheries of the wheel along the printing line will always indicate the time of day as shown by the clock. While the driving gearing for these time recording wheels may be varied within a wide range I prefer to use that illustrated in Fig. 6 to insure that the turning of the wheels of the set 3 shall be intermittent, and each movement practically instantaneous. To secure this result I provide a separate coiled spring driving mechanism indicated generally at 66 connected with the wheels 3, through a gear train 67, that terminates in a ratchet escapement wheel 51, mounted on the shaft 6 and connected with the units wheel of the set 3. With this ratchet wheel there engages a double armed escapement lever 48 having an extension arm. Upon the minute shaft of the clock is arranged a gear wheel 32 that is the first of a gear train 33, to the terminal gear 34 of which is secured a double-armed rotatable lever 44 provided with projections adapted to act upon the extension of the escapement lever 48. The ratios of the gears 32 and 34 are such that the latter is revolved once every two minutes with the result that the escapement lever 48 is actuated once each minute and as its actuations momentarily release the escapement wheel 51, the latter, and with it the units wheel of the set 3, is quickly turned one step from the spring box 66.

The time recording wheels of the group 4 are connected, through a gear train 35, 36, 79 with the seconds shaft of the clock mechanism Fig. 11. The wheel 36 of this gear train is movable so that the connection between the clock mechanism and the printing wheels may be made or broken as desired and in the manner that will be presently described.

The numbering wheels 5 are operated each time an operation of the machine being timed is completed, as represented in Figs. 8 and 10. It is to be understood that the several wheels of this, as well as of the other recording groups, are interconnected in a manner common in numbering machines; and as such interconnecting means do not form a part of the present invention and are well known in the art they are not herein illustrated in detail. Suffice it to say that they should be devised to perform the successive advance of a wheel of the next higher order whenever the associated wheel of a lower order completes a revolution.

Whenever the machine whose operations are being timed performs a certain movement, as for instance, when the loading skip B is elevated to position to discharge into the mixing drum, it sets the timing mechanism or batch meter, as has been described, and this operation of setting causes the wheels 11 and 12 to be rotated each a partial revolution.

Figure 2:
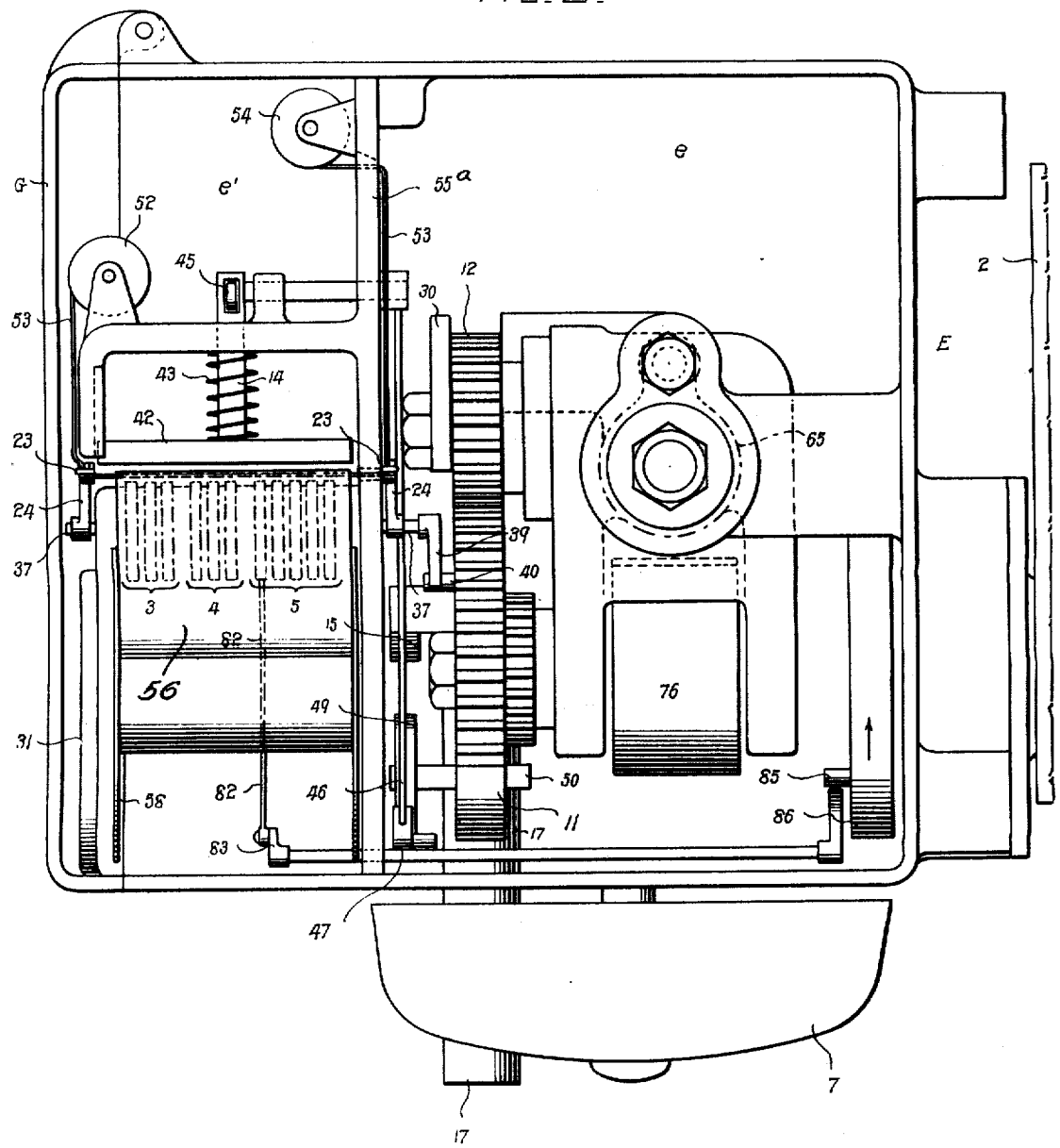
Fig. 2 is an end view of the apparatus shown in Fig. 1, the end of the casing being removed on the line II—II Fig. 1.
Figure 9:
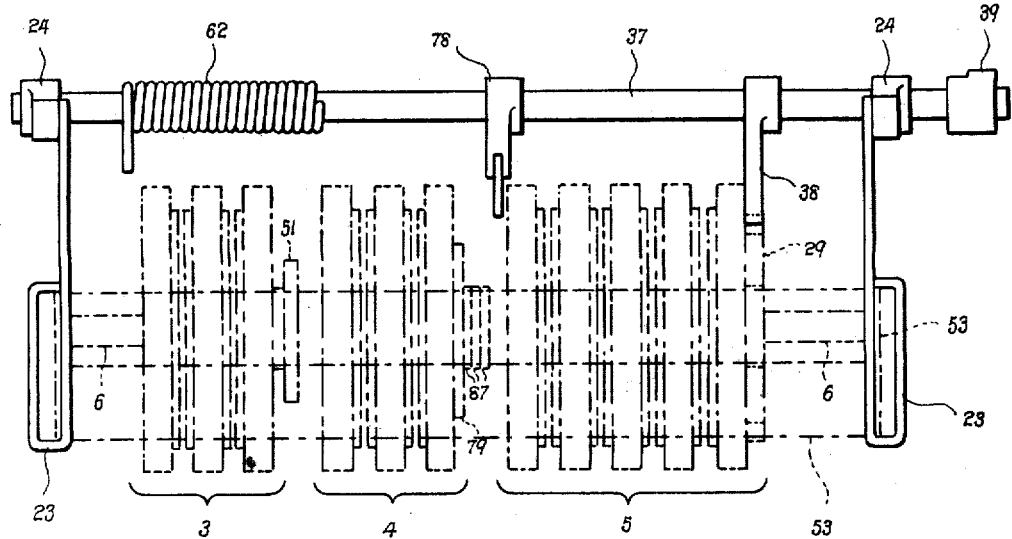
Fig. 9 is a plan view of the shaft 37 and the parts carried thereby.
Figure 7:
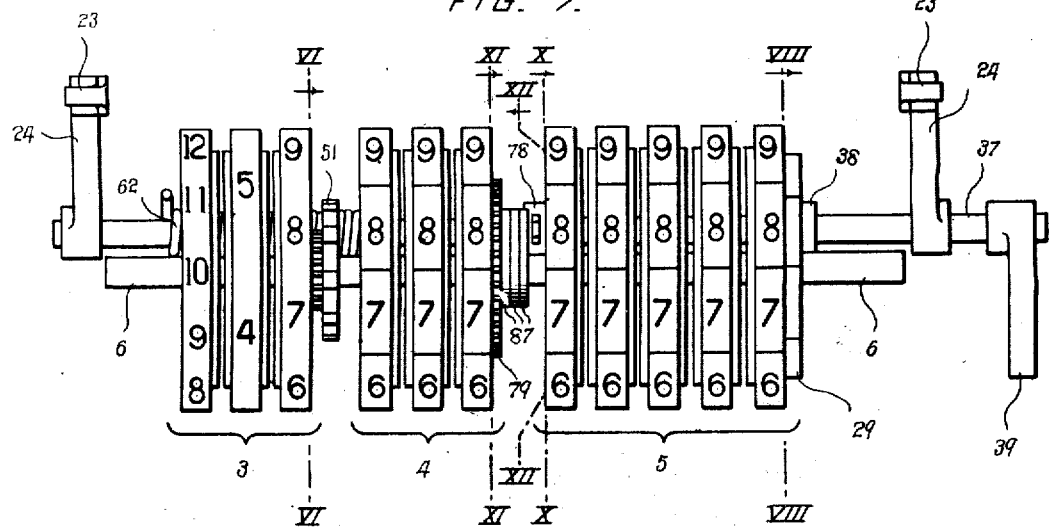
Fig. 7 is an elevation, on a larger scale than the views that have been described, of the several sets of printing wheels and the shaft 37 with its associated parts.

The wheel 11 is represented as carrying a pin 40, Figs. 1 and 2 that acts upon a lever 39 projecting from a shaft 37, when the parts of the batch timer are in the position of inaction, represented in Figs. 1 and 10 and in dotted lines in Fig. 8, and moves such lever, against the action of a spring 62, Figures 7 and 9, connected with the shaft 37. As soon as the timing device is set, turning the wheel 11 in the direction of the arrow Fig. 10, the pin 40 moves away from the lever 39, and the spring 62, acting through the shaft 37, moves the lever 39 into the position indicated by full lines in Fig. 8. 38 indicates a pawl carried by the shaft 37 and arranged to act upon a ratchet wheel 29, mounted upon the shaft 6 and connected with the units wheel of the group 5 of recording wheels, and to serve as a driver therefor. It will be understood that after the timing mechanism is set the wheel 11 reverses its direction of movement, and at the end of the timed period comes back to the position indicated in Figs. 1 and 10, with the pin 40 in engagement with the lever 39, which has been moved from the full line position Fig. 8 to that indicated in dotted lines, such movement causing an advance of the unit member of the set 5 of numbering wheels one step.

It has already herein been intimated that the group of wheels 4 which are employed to record the time employed in performing an operation of the apparatus to which my invention is applied is connected with one of the shafts of the clock mechanism, the seconds shaft in this instance, since the duration of each operation is measured and recorded in seconds of time and that such connection is intermittent in its nature.

Referring particularly to Figure 11, 68 indicates a frame pivotally supported upon the seconds shaft of the clock mechanism and in which is mounted the gear wheel 36 in constant mesh with the gear 35 on the seconds shaft. This wheel connects the gear 35 with a gear 79 connected with the unit wheel of the group 4 of printing wheels. A spring 69 bears upon the frame 68 and tends to move it and the wheel 36 supported thereby into engagement with the wheel 79 as indicated by dotted lines, Fig. 11.

The frame 68 is provided with an extension 70 constituting a pawl, the end of which engages with a slotted disk wheel 71. In the arrangement illustrated in the drawings the peripheral portion of the disk wheel 71 with which the pawl 70 engages has formed in it six slots into which the nose of the pawl may enter, the segments of the wheel between the slots being of twice the width of the slots. It will be seen by reference to Fig. 11 of the drawings that when the pawl bears upon a segment of the wheel 71 the frame 68 is rocked so as to move the gear 36 away from the wheel 79, and whenever the nose of the pawl enters one of the slots the frame is moved, under the action of the spring 69, so the gear 36 is in engagement with the wheel 79, thus putting the latter into operative connection with the seconds shaft of the clock mechanism. Secured to one face of the slotted disk wheel 71 is a compound ratchet wheel 72 Figures 12 and 13. This wheel is formed of three thin ratchet wheels each formed with six teeth, and these are placed side by side and are arranged to have their teeth in staggered relation to each other so that the combined appearance of the three wheels, when observed from the side, is that of single ratchet wheel having eighteen teeth Fig. 12. The several sections of the wheel 72 are secured fast to each other and to the slotted wheel 71. Engaging with the wheel 72 are three independent driving pawls each pawl acting only upon its individual section of the wheel, and the pawls are so arranged that as they are successively operated they will each impart an advance or rotative movement to the wheels 72 and 71 of one eighteenth of a complete revolution. The pawls are also arranged so that they must be operated in sequence and the wheel 72 is rotated only when such sequential operations take place.

73 indicates one of these pawls, supported upon a reciprocating rod 74 and arranged to act upon one of the sections of the wheel 72, which for designation may be termed the first section. A spring 75 acts on the rod to hold it normally in retracted position, and the rod carries a tappet 77 that is engaged by a pawl carried by an arm 78 fixed to the shaft 37. A second pawl 80 carried by a rod 81, Figures 11, 12 and 13, is arranged to engage with the third segment of the wheel 72. This rod 81 is provided with an extension formed with a head or contact end 84 that is adapted to be acted upon by the hammer that is employed to make a printed impression upon the record strip or tape 56, which part will be later described. When the rod is thus operated the pawl 80 acts to advance the wheel 72.

The intermediate or second segment of the wheel 72 is acted upon by a pawl 93 carried by a lever 94 which is connected by a link 82 with an arm 83. This arm is arranged to be operated from some moving part of the apparatus which acts to move the same and reciprocate the pawl 93 to turn the wheel 72 one step at the proper instant. A convenient part of the apparatus illustrated for this purpose is a projection 85 carried by the disk 86 on the spring box of the batch meter or timing mechanism Figs. 2 and 10. Such projection operates to move the arm 83 at the moment the timing mechanism is to begin to function.

The operation of the parts just described will now be set forth, starting from the position indicated in Fig. 11, with the parts of the batch meter at rest.

By reference to the said view it will be seen that the pawl extension 70 of the frame 68 rests at its first position upon a segment of the wheel 71, which is to be turned in the direction of the arrow by the several pawls 73, 80 and 93.

The mechanism being in the position referred to, it will be assumed that a batch of material is delivered to the mixing drum, such delivery causing the batch timer to be set, freeing the shaft 37, by removing the contact pin 40 from engagement with the lever 39, and permitting the shaft to be turned by its spring 62. This rotative movement of the shaft causes the arm 78 thereof to move in the direction of the arrow Fig. 12 and act upon the tappet 77, moving the rod and the pawl that it carries, the pawl 73 acting upon its segment of the wheel 72 and moving it one step, bringing the pawl extension 70 of the frame 68 to its second position on the segment of the wheel 71. So long as this extension rests on a segment, the time recording wheels 4 are disconnected from the clock mechanism, as has been explained. The next advance of the wheels 71 and 72, which starts the timing mechanism to function, takes place when the loading skip is lowered from its charging position; and to effect this the projection 85 acts to operate the arm 83, Figures 2 and 10, the disk 86 that carries the projection moving coincidentally at this time with the loading skip. This advances the wheel 71 a second step through movements of arm 83, link 82, lever 94 and pawl 93 and brings one of the slots therein beneath the nose of the pawl extension 70, permitting the frame 68 to be rocked so as to put the recording wheels 4 into operative connection with the clock mechanism. This condition maintains until the mixing operation has been completed and a record thereof is made by the action of the printing hammer 42, which, engaging with the head 84 of the rod 81, Figures 1, 11, 12 and 13, operates the pawl 80 and turns the wheel one step. This makes the third movement of the wheels 72 and 71, bringing the parts into the relative positions indicated in Fig. 11 when the sequence of operations just described is repeated. It will thus be seen that the recording wheels 4 are maintained in operative connection with the clock mechanism from the time the mixing operation begins, corresponding with the movement of the pawl 93 until the end of the mixing period, indicated by the operation of the pawl 80, and that the duration of this period is indicated in seconds by the record made by the wheels 4 when the printing hammer is actuated.

After each record is made, as just described, the printing wheels of the set 4 must be normalized, and for that purpose I provide each of them with a heart-shaped cam 87, Figures 7, 11 and 14. These cams are connected with their respective numbering wheels through hollow shafts 88 concentrically arranged upon the supporting shaft 6 as represented in Fig. 14. The hollow shafts are preferably of different lengths so that the several cams 87 are grouped close together and side by side. Engaging with each cam 87 is a curved lever 89 (Fig. 11), formed with a projection 90 adapted to be moved into engagement with the periphery of the cam with which it is associated through the action of a spring 92. Each lever is formed with an extension 91 beyond its pivot, shaped to engage with the slotted peripheral portion of the disk wheel 71. The inner ends of the levers 89—that is the ends opposite the extensions 91—are connected through a sliding forked connection 95 with the lever 96 in which is supported the shaft upon which are mounted for rotation the toothed pinions 97, employed for advancing the second and third recording wheels. When, however, the extensions 91 of the levers enter a slot of the wheel the levers are free to move under the influence of the spring 92, forcing the projections 90 into engagement with the cams 87, and at the same time shifting the lever or frame that carries the pinions 97 out of driving connection with the printing wheels, which are thus left free to rotate, and the force of the spring 92 is sufficient to move the levers rapidly and so that their projections 90 come into engagement with the heart-shaped cams of the printing wheels and impart thereto hammer-like blows, with the result that, owing to the shape of the cams, the wheels are restored to normal position with the projections 90 in the depressions or low points of the cams. In normalizing the printing wheels 4 it matters not what were their positions at the moment of printing because, being free to move, they may be turned either in a forward or a backward direction to normal position owing to the shape of the cams.

I have already described the operation of putting the printing wheels 4 into operative connection with the clock mechanism. Simultaneously with such operation the normalizing levers 89 are moved to free the printing wheels so they may be driven.

When the parts are in normal positions, as represented in Figs. 1 and 11, the noses of the extensions 91 of the normalizing levers occupy the second position on the segment of the wheel 71 and the nose of the extension of the lever or frame carrying the movable connecting gear 36 occupies the first position on another segment. It follows, as is clearly shown in Fig. 11, that the printing wheels 4 are free to be turned and that they are not in connection with the clock mechanism. At the first advance movement of the slotted disk wheel 71 the noses of the pawl extensions 91 of the normalizing levers are forced into a slot or recess of the segmental disk wheel, bringing the levers into impinging engagement with the cams 87 and restoring the printing wheels to normal position and at the same time throwing the carrying wheels 97 into inactive positions. The advance movement of the wheel 71 just referred to causes the nose of the extension 70 to occupy the second position upon a segment of the wheel but this does not change the position of the frame or lever 68 and so the connection of the printing wheels with the clock mechanism remains broken. The further movements of the normalizing elements and the turning elements of the printing wheels may be easily followed, step by step, by reference to the drawings and from the foregoing description.

It will thus be seen that the operation of the charging drum of a concrete mixer, sets the batch meter, normalizes the timing wheels, and advances the numbering wheels 5 one unit. But as yet the timing mechanism has not begun to operate nor has the gear connection between the clock and the time recording wheels 4 been established. These operations take place as soon as the loading skip begins or completes, as may be arranged, its return or downward movement, and the timing begins. One form of mechanism which permits the batch timer to begin to function, when the drum has received its full charge and the loading skip begins to descend, is fully described and illustrated in my aforesaid application.

The batch timer being started moves for a determined period of time, say 60 seconds, or whatever time may be determined upon as the minimum period that the machine to which my invention is applied shall take to properly and completely perform an operation for which it is intended. When this period has elapsed the parts of the timing mechanism will have come to the positions indicated in Fig. 1 and have stopped, the wheel 11 having turned until the pin 40 has engaged and moved the lever 39 against the action of its spring 62. The connection with the clock mechanism and the timing wheels 4 has however not been disturbed by these movements of the timing mechanism. For, while the completion of the period measured by the timing mechanism causes a signal to be given,— indicating that the operation of the machine has been properly performed, and, in the case of a concrete mixer, that the batch within the mixing drum is in suitable condition to be discharged; yet since the discharge chute is under manual control, the discharge need not take place at the instant the signal is given, and therefore the recording mechanism herein described is arranged to indicate the full length of time that each batch is within the drum and being mixed, irrespective of the operation of the batchmeter or timing mechanism. The operator upon hearing the signal given by the bell 7 at the end of the period measured by the timing mechanism is supposed to discharge the batch from the drum, which he does by moving the hand lever F. This lever is connected with the rod 17 which enters the casing E, the latter being moved upwardly and against the action of a spring 22 when the handle F is operated and the discharge chute C moved to delivery position. The rod 17 is represented as carrying a collar 19 with which engages a latch 18, acted upon by a spring 20 that tends to move it to a position over the collar 19. The latch is moved to its inactive position, represented in Fig. 1, by a cam 30, carried by the wheel 12 of the timing mechanism and arranged to act upon a contact pin 21 of the latch 18. These last referred to parts are fully described in my aforesaid application. They are used with my batch meter when it is desired to positively lock the discharge chute in its inactive or non-delivery position during the operation of the batch meter. With my present invention the locking mechanism for the discharge chute may be dispensed with or used, as desired. If it be dispensed with, the discharge chute is under manual control and may be moved to delivery position before the batch timer has completed its movement; but should this take place the record made upon the tape 56 will clearly disclose this fact. Therefore, so far as the present invention is concerned the locking mechanism for the discharge chute, consisting of the parts 19, 18 and 30, may be disregarded. The bolt 17, however, carries a second collar 50, and this serves to impart motion to the printing mechanism, which I will now describe, whenever the bolt is shifted due to a movement of the discharge chute to delivery position.

42 indicates a printing hammer already herein referred to, arranged above the printing wheels and extending entirely across the three sets, 3, 4 and 5, thereof. It is suitably supported and guided and has a centrally arranged supporting shaft 14, surrounded by a coiled spring 43. The shaft 14 is connected, by a lever 45, a link 46 and another lever 47, with a trigger 49 that is adapted to engage with the collar 50 on the bolt 17. When the bolt 17 is raised, through the movement of the discharge chute or the mechanism that moves such chute, the printing hammer 42 will be moved upwardly, compressing the spring 43, until the trigger 49, through engagement with a stationary cam 15, is shifted and caused to disengage the collar 50. When this disengagement takes place the hammer 42, being freed, is forced downward by its spring 43 and strikes a sharp blow against the printing wheels. The numbers on the wheels that may at the moment be opposite the hammer cause a record to be printed upon the tape 56. The movement of the hammer to produce a record on the tape also operates the pawl 80, as has been described, to cause the third, or final, movement of the segmental disk wheel 71, leaving the parts in the position indicated in Fig. 11.

The tape 56 is wound upon the spools 57 and 58 Figures 1 and 2 and suitably guided beneath the hammer 42 and close over the sets of printing wheels, 3, 4 and 5.

An ink ribbon 53, wound upon the spools 52 and 54 suitably supported, extends across the faces of the groups of printing wheels and between them and the tape 56. The ribbon is formed of two sections carrying ink of different colors, as for instance black and red. The portion of the ribbon that is passing over the printing wheels is supported in a shiftable guide and support which preferably consists of a pair of arms 23 Figures 1, 2, 9 and 10 looped to encircle the ribbon and connected with and operated by crank arms 24 at the ends of the shaft 37. The arrangement is such that when the shaft 37 and the parts that it carries are in the position indicated in Fig. 10 the ribbon guide will be moved so as to bring the black portion of the ribbon over the printing segments of the numbering wheels and this is the normal position of the ribbon. When, however, the shaft 37 is turned to the position indicated in full lines in Fig. 8, which position is maintained during the period from the starting of the timing mechanism to the full end of the period of its operation, the ribbon guide is moved to shift the ribbon so that its red portion is over the printing wheels, and, if a record be made during this stated period, it will appear upon the record tape in red. From this it follows that should a record be printed at any time after the batch timer has been set and before the full period it operates has elapsed the record will be made in red ink; but if the batch timer has completed its movement the record will be in black. It will be understood that when the machine is normally and properly opearting all of the records will be in black, and that a red record indicates that the termination of the mixing or other operation of the machine being timed has taken place before the minimum time allowed for such operation has elapsed.

A record of several successive operations as made by the apparatus described is shown in Fig. 4, referring to which it will be seen that the first batch, numbered on the section $k$ of the tape 56, was discharged at 7.15, as indicated in section $i$ of the tape, after it had been mixed 65 seconds, as indicated by the record in section $j$ of the tape. The record further shows that the second batch was discharged at 7.16 after having been mixed 63 seconds, and the third batch was discharged at 7.19 after having been mixed 68 seconds. The records for these three operations of the machine are printed in black ink. The fourth record is printed in red and indicates that this, the fourth, batch was discharged at 7.21, after having been mixed but 45 seconds. As this mixing period was 15 seconds short of the minimum mixing period, the batch meter being, it is supposed, adjusted to operate 60 seconds, attention is directed to this fact by the automatically produced printed record. The next printed record indicates that the discharge chute was moved a second time, at 7.22, for the fourth batch of material, this being indicated by the record on the parts $j$ and $k$ being repeated from the next immediately preceding record. This operation is permitted since the discharge chute is under manual control and the record indicates that before the mixing drum was recharged for the 5th batch, for some reason, the discharge chute was a second time moved to discharge position.

The record for the 5th batch shows that this was discharged at 8.12 after having been mixed 70 seconds. This record at once attracts attention because of the long period of time elapsing between successive records, namely 50 minutes, and clearly shows that the machine was not operating for practically that length of time, for which the contractor would naturally seek an explanation. The record for the 6th operation or batch produced is printed in red, because the material was mixed but 52 seconds.

From this record made by the machine it is apparent that the contractor's interests are guarded, as the record shows when any unduly long period of time elapses between successive operations; and also that the interests of the one of whom the work is being done are guarded by the printing in a distinctive color or manner those records where the work was slighted or insufficiently performed.

The record tape is advanced a step at a time as each record is made thereon and for this purpose any suitable mechanism may be employed. I have illustrated this by a friction wheel 55 Figure 1 engaging the tape and this is intermittently moved through the action of a pawl carrying lever 41 that is actuated by the printing hammer as it reciprocates.

What I claim is:

1. The combination with a machine whose operations are to be timed, of a timing device, a recording mechanism for indicating the length of time taken for an operation of the machine, means for causing the timing device and the recording mechanism to be set into operation simultaneously by the said machine, and means for terminating the individual operations of the machine and for causing the recording mechanism to make its records thereof.

2. The combination with a machine whose operations are to be timed, of a batchmeter adjusted to run for a determined period and then come to rest, a recording mechanism for indicating the length of time taken for each operation of the machine arranged to make its records in one or another of at least two distinctive manners, means for causing the batchmeter and the recording mechanism to be set into operation simultaneously by the said machine, means operated by the batchmeter at the time it comes to rest for controlling the recording mechanism and causing it to change the character of the record it will thereafter make, and means operating at the termination of the individual operations of the machine and for causing the recording mechanism to made its records thereof.

3. The combination with a machine whose operations are to be timed, of a timing device, a recording mechanism having printing wheels for recording the length of time taken for each operation of the machine, a clock mechanism, a gear train between the clock mechanism and the recording mechanism, constructed to permit the connection between the clock and recording mechanisms to be intermittently made and broken, means for simultaneously setting the timing device into operation and for completing the gear connection between the clock and recording mechanisms when an operation of the machine begins, and manually controlled means for terminating the individual operations of the machine, for causing the recording mechanisms to make its records thereof and for interrupting the gear connection between the clock and recording mechanisms.

4. The combination stated in claim 3 including also means for normalizing the recording wheels to their zero positions after the making of each record and means for operating the normalizing means operated from the machine whose operations are being timed and recorded.

5. In an apparatus for timing and recording the operations of a machine, the combination of a time-metering device including an element that may be set to run for a determined period, recording mechanism including printing wheels driven by clockwork, means for setting into operation simultaneously the time metering device and the printing wheels, means whereby a record may be made by the recording mechanism in either of two distinctive ways, means whereby the record will be produced in one distinctive way if made during the determined period but will be made in another distinctive way if made after the termination of such period; and means independent of the time metering mechanism for causing the record to be made.

6. In a timing and recording apparatus the combination of a timing device adapted to operate for determined periods of time, recording mechanism arranged to be set to make its records in either of two distinctive manners, means for setting the recording mechanism to make its record in one distinctive manner when the timing device begins to operate, and to set it to make its record in another distinctive manner after the timing device has operated its determined period, and means operable independently of the timing device for causing the record to be made.

7. In a timing and recording apparatus, the combination of a timing device adapted to operate for determined periods of time, printing recording mechanism provided with a two-color ink ribbon, means for shifting the ink ribbon when the timing device begins to operate so the record will be made in one color, and for shifting the ribbon when the timing device has operated its determined period so the record will be made in another color and means operable independently of the timing device for causing the record to be made.

8. In apparatus for timing and recording the operations of a machine, the combination of a timing device including an element that may be set to run for determined periods, a recording device controlled by clockwork, means for simultaneously setting into operation the timing device and the recording device, means by which the record may be made to exhibit either of two distinctive characteristics, automatically operated adjusting means for causing the record to be of one distinctive character if made while the timing element is running, and to be of another distinctive character if made after the timing element has completed its operation, and manually controlled means for causing the record to be made.

9. In apparatus for timing and recording the operations of a machine, the combination of a timing device including an element that may be set to operate for determined periods, a recording device operated by clockwork, means for setting into operation both the timing device and the recording device, upon the commencement of the operation of the machine which is to be timed, means by which the record may be made to exhibit either of two distinctive characteristics, adjusting means for causing the record to be of one distinctive character if made while the timing element is operating and to be of another distinctive character if made after the timing element has completed its operation, and manually controlled means for simultaneously causing the timed operation of the machine to be ended and for causing the record to be made.

10. A timing and recording mechanism for the separate operations of a machine, including a clock, a set of recording wheels, gearing between the clock and the wheels by which the latter are caused to indicate the time of day, a second set of recording wheels, a train of gearing for operating the second set of wheels arranged to be intermittently put into connection with one of the shafts of the clock, means actuated from the machine whose operations are being timed and recorded for shifting the gearing to put the second set of recording wheels into connection with the clock when an operation of the machine is started, manually controlled means for ending an operation and causing a record thereof to be printed upon a tape from the aforesaid sets of wheels, means for shifting the gearing connecting the wheels that record the times of operation with the clock at the instant each printed record is made, and means operated by the printing means for intermittently advancing the tape after each record has been made.

11. A timing and recording mechanism for the separate operations of a machine, including a clock, a set of recording wheels, gearing between the clock and the wheels by which the latter are caused to indicate the time of day, a second set of recording wheels, a train of gearing for operating the second set of wheels arranged to be intermittently put into connection with one of the shafts of the clock, means actuated from the machine whose operations are being timed and recorded for shifting the gearing to put the second set of recording wheels into connection with the clock, when an operation of the machine is started, manually controlled means for ending an operation and causing a record thereof to be printed upon a tape from the aforesaid sets of wheels, means for shifting the gearing connecting the wheels that record the times of operation with the clock at the instant each printed record is made, means for intermittently advancing the tape and means for normalizing the second set of printing wheels after each record has been made.

12. In time recording apparatus, the combination of a time metering device, a clock mechanism, a recording mechanism having two sets of recording means, one for recording the time of day having permanent connection with the clock mechanism, and the other for recording the time of successive operations having an intermittent connection with the clock mechanism, means for simultaneously setting into operation the time metering device and connecting the clock mechanism with the recording mechanism through its said intermittently operated connection, means operating independently of the means that establish such connection for interrupting the last said connection of the clock mechanism with the recording mechanism and means for making a record when the said connection is interrupted.

13. In time recording apparatus, the combination with mechanism whose operations are to be timed, of a time metering device, a recording mechanism having a set of recording means for showing the time for successive individual operations of the apparatus, connection between the clock mechanism and the set of recording means arranged to be intermittently made and broken, means automatically operated by movement of the mechanism whose operations are being timed for setting into operation the metering device and establishing connection between the clock mechanism and the recording mechanism, and means independent of that establishing such connection for breaking the same, said means being operable independently of the operation of the time metering device.

14. In apparatus for recording the duration of individual mechanical operations, the combination of a clock driven recording mechanism, operative connections between the clock mechanism and the recording mechanism arranged to be intermittently made and broken, means for normalizing the recording mechanism after each record, means for performing in sequence the following operations (1) operating the normalizing means (2) making the connection between the clock mechanism and the recording mechanism and (3) breaking such connection, and means for performing the said sequential operations.

15. In apparatus for recording the duration of individual mechanical operations, the combination of a clock driven recording mechanism, operative connections between the clock mechanism and the recording mechanism arranged to be intermittently made and broken, means for normalizing the recording mechanism after each record, means for performing in sequence the following operations (1) operating the normalizing means (2) making the connection between the clock mechanism and the recording mechanism and (3) breaking such connection, and making the record, and means for performing the said sequential operations.

16. The combination stated in claim 14 wherein the means for performing operations 1 and 2 are automatic and wherein the means for performing operation 3 are under manual control.

17. The combination stated in claim 14 wherein the means for performing the sequential operations therein set forth include a segmental wheel controlling the operations respectively of the normalizing devices and the means that intermittently connect and disconnect the clock and recording mechanisms.

18. The combination stated in claim 14 wherein the means for performing sequential operations therein stated include a wheel formed of three sections with each of which sections engages a driving pawl, each pawl constituting an element of one of the connections between the machine whose operations are being timed and recorded and the recording mechanism.

19. In apparatus for recording the duration of individual mechanical operations, the combination of a clock driven recording mechanism comprising a plurality of numbering wheels arranged side by side, intermediate gearing between the clock mechanism and recording wheels, a supporting frame for the said intermediate gearing movable so as to either make or break the connection, a set of levers for normalizing the several printing wheels, a segmental wheel with which engages extensions from the movable frame of said intermediate gear and also from the normalizing levers, said segmental wheel controlling the movements of the intermediate gearing and normalizing levers, a multiple ratchet wheel connected with the segmental wheel formed of three sections the teeth of the sections of the multiple ratchet wheel being staggered, pawls engaging respectively with the sections of the ratchet wheel for rotating the same and the segmental wheel a step at a time, and means operated from the mechanism whose operations are being timed and recorded for moving the pawls in succession.

SAMUEL SHAFER, Jr.